United States Patent
Lin et al.

(10) Patent No.: US 7,833,578 B2
(45) Date of Patent: Nov. 16, 2010

(54) COMPOSITION AND METHOD FOR FABRICATING MICROCAPSULES ENCAPSULATING PHASE-CHANGE MATERIAL

(75) Inventors: Yen-Hsi Lin, Taipei (TW); Chi-Shu Wei, Shulin (TW)

(73) Assignee: Taiwan Textile Research Institute, Tu-Chen, Taipei Hsien (TW)

( * ) Notice: Subject to any disclaimer, the term of this patent is extended or adjusted under 35 U.S.C. 154(b) by 489 days.

(21) Appl. No.: 12/046,930

(22) Filed: Mar. 12, 2008

(65) Prior Publication Data
US 2008/0157415 A1 Jul. 3, 2008

Related U.S. Application Data

(63) Continuation-in-part of application No. 10/612,994, filed on Jul. 7, 2003, now abandoned.

(51) Int. Cl.
| | |
|---|---|
| A61K 9/127 | (2006.01) |
| B01J 13/00 | (2006.01) |
| B01J 13/02 | (2006.01) |
| B01J 13/04 | (2006.01) |
| B01J 13/18 | (2006.01) |
| B05D 7/00 | (2006.01) |
| B32B 5/16 | (2006.01) |
| B32B 9/00 | (2006.01) |
| B32B 15/02 | (2006.01) |
| B32B 17/02 | (2006.01) |
| B32B 19/00 | (2006.01) |
| B32B 21/02 | (2006.01) |
| B32B 23/02 | (2006.01) |
| B32B 27/02 | (2006.01) |
| C08G 18/08 | (2006.01) |
| C08G 18/28 | (2006.01) |
| C08G 73/00 | (2006.01) |
| C08J 3/00 | (2006.01) |
| C08K 3/20 | (2006.01) |
| C08K 5/06 | (2006.01) |
| C08K 5/10 | (2006.01) |
| C08K 5/101 | (2006.01) |
| C08L 75/00 | (2006.01) |
| C08L 83/00 | (2006.01) |
| C08L 83/04 | (2006.01) |

(52) U.S. Cl. ............ 427/213.32; 264/4.1; 264/4.3; 264/4.33; 264/4.7; 427/212; 427/213.31; 427/213.33; 427/213.36; 427/221; 428/402; 428/402.24; 428/403; 428/407; 524/315; 524/476; 524/477; 524/478; 524/588; 524/591; 524/839; 524/840; 525/457

(58) Field of Classification Search ............ 264/4.1, 264/4.3, 4.33, 4.7; 427/212, 213.32, 213.33, 427/213.36, 221; 428/402, 402.24, 403, 428/407; 524/315, 476, 477, 478, 588, 591, 524/839, 840; 525/457
See application file for complete search history.

(56) References Cited

U.S. PATENT DOCUMENTS

| | | | | |
|---|---|---|---|---|
| 2,523,848 | A * | 9/1950 | Schaerer et al. | 106/270 |
| 4,439,581 | A * | 3/1984 | Irii et al. | 524/839 |
| 4,708,812 | A | 11/1987 | Hatfield | |
| 5,366,801 | A | 11/1994 | Bryant et al. | |
| 5,456,852 | A | 10/1995 | Isiguro | |
| 6,200,681 | B1 | 3/2001 | Jahns et al. | |
| 6,207,738 | B1 | 3/2001 | Zuckerman et al. | |
| 6,270,836 | B1 | 8/2001 | Holman | |
| 6,689,466 | B2 * | 2/2004 | Hartmann | 428/402.2 |
| 2001/0000517 | A1 | 4/2001 | Zuckerman et al. | |
| 2002/0079599 | A1 | 6/2002 | Kleban et al. | |
| 2003/0222378 | A1 | 12/2003 | Xing et al. | |

FOREIGN PATENT DOCUMENTS

| | | |
|---|---|---|
| DE | 2523586 | 12/1976 |
| DE | 10051194 | 4/2002 |
| DE | 69432297 T | 2/2004 |
| EP | 0686425 | 12/1995 |
| GB | 1529517 | 10/1978 |

OTHER PUBLICATIONS

Rosthauser, J.W. & Nachtkamp, K.; "Waterborne Polyurethanes;" Advances in Urethane Science and Technology, vol. 10; 1987; pp. 1-37.
Lin, et al., Requirement for Restriction/Election, mailed Oct. 3, 2005, U.S. Appl. No. 10/614,994, filed Jul. 7, 2003.
Lin, et al., Non-Final Office Action, mailed Jan. 30, 2003, U.S. Appl. No. 10/614,994, filed Jul. 7, 2003.
Lin, et al., Notice of Non-Compliant Amendment, mailed Jul. 28, 2006, U.S. Appl. No. 10/614,994, filed Jul. 7, 2003.
Lin, et al., Notice of Non-Compliant Amendment, mailed Nov. 14, 2006, U.S. Appl. No. 10/614,994, filed Jul. 7, 2003.
Lin, et al., Final Office Action, mailed Mar. 2, 2007, U.S. Appl. No. 10/614,994, filed Jul. 7, 2003.
Lin, et al., Advisory Action, mailed Jun. 15, 2007, U.S. Appl. No. 10/614,994, filed Jul. 7, 2003.
Lin, et al., Non-Final Office Action, mailed Sep. 12, 2007, U.S. Appl. No. 10/614,994, filed Jul. 7, 2003.

* cited by examiner

*Primary Examiner*—Patrick D Niland
(74) *Attorney, Agent, or Firm*—Thomas, Kayden, Horstemeyer & Risley, LLP

(57) ABSTRACT

A composition and a method for fabricating microcapsules encapsulating phase-change material by interfacial condensation polymerization are provided. In this composition and method, a surfactant and an organic solvent are not needed.

26 Claims, No Drawings

COMPOSITION AND METHOD FOR FABRICATING MICROCAPSULES ENCAPSULATING PHASE-CHANGE MATERIAL

CROSS-REFERENCE TO RELATED APPLICATION

This application is a continuation-in-part of U.S. application Ser. No. 10/612,994, filed Jul. 7, 2003, the full disclosure of which is incorporated herein by reference.

BACKGROUND

1. Field of Invention

The present invention relates to a composition and a method for fabricating microcapsules encapsulating phase-change material, which is especially suitably applied on fabrics.

2. Description of Related Art

Heat-storage (or heat-release) materials, namely phase-change materials (PCM), undergoes physical phase changes, e.g. solid phase to liquid phase or liquid phase to solid phase, in a specific temperature range. Many materials can be regarded as PCM in a particular temperature range. For example, in the temperature range of about 0° C., water-ice can be used as a PCM.

Two factors need to be considered for choosing PCM, including the temperature range that PCM is applicable and the amount (size) of latent heat absorbed or released by PCM during the phase change. Basically, PCM having the proper temperature range is selected by the environmental temperature requirements. Preferably, PCM with larger latent heat are used. Since larger latent heat allows PCM absorbs or releases more heat amount during its phase change, PCM can stay in the phase-change temperature range for a longer period.

Since the phase change of PCM between liquid phase and solid phase are mostly utilized, PCM needs a coat, especially in liquid phase. A recent technology has been developed to encompass PCM in microcapsules to retain PCM in the liquid phase.

Many methods of fabricating microcapsules have been provided. These method comprises a chemical synthetic method, a physical chemical synthetic method and a physical mechanical synthetic method. The chemical synthetic method further includes interfacial condensation polymerization, in-situ polymerization and shape-hole condensed bath. Among them, the interfacial condensation polymerization has several advantages, such as fast reaction rate, mild reaction condition, loose requirement to the purity of the starting material, and high tolerance of ratio of the starting material in the reaction composition. Therefore, the interfacial condensation polymerization is preferably used.

The interfacial condensation polymerization is performed on the interface of water and oil to form shells of the microcapsules. Hence, a water phase and an oil phase are both presented in the initial reaction composition of the interfacial condensation polymerization. In water phase, a surfactant and at least a hydrophilic monomer of the microcapsule shell are in the water. In oil phase, a phase-change material and a lipophilic monomer of the microcapsule shell are in a hydrophobic solvent, such as dichloromethane, chloroform, trichloroethane, tetrachlorodifluoroethane, carbon tetrachloride, benzene, toluene, xylene, carbon disulfide, pentane, cyclohexane, mineral oil or a combination thereof.

In the initial reaction composition, the surfactant can surround the oil phase to form micelles in the water phase. Then, a polymerization reaction of the lipophilic monomer and the hydrophilic monomer is proceeded on the surface of the micelles to form shells of microcapsules to encapsulate the phase-change material. The usually used surfactant in the interfacial condensation polymerization includes polyethylene alcohol, gelatin, methyl cellulose or other surfactants.

Typically, compounds with no or low polarity, such as aliphatic or aryl hydrocarbons, are used as the phase-change material in the prior interfacial condensation polymerization. Since the lipophilic monomer, such as acyl chloride, epoxide, and isocyanate, is a compound with higher polarity, the phase-change material and the lipophilic monomer cannot be uniformly mixed to form a homogeneous oil phase. Therefore, at least one organic solvent has to be added in the oil phase to help to form a homogeneous oil phase.

The disadvantage of using organic solvent is that the organic solvent could be remained inside the microcapsules. The remained organic solvent inside the microcapsules affects the thermal property of the microcapsules and the designed phase-change temperature range. In the prior interfacial condensation polymerization, although a heating process is used to remove the organic solvent, some organic solvent may still be encompassed inside the microcapsule.

Moreover, since the shells of the microcapsules are lipophilic, i.e. hydrophobic, the obtained microcapsules are dispersed in the organic solvent. However, the fabric coating solution, in which the microcapsules have to be suspended therein, is an aqueous solution. Therefore, the organic solvent has to be removed after the microcapsules are formed. In the solvent removing process, high temperature could damage the polymer shells of the microcapsules. Hence, the microcapsules may break in latter processes, and thus the PCM leaks.

SUMMARY

In one aspect, a composition for fabricating microcapsules encapsulating phase-change material are provided. The composition comprises water, a waterborne polyurethane dispersed in the water, a polar phase-change material, a lipophilic monomer dissolved in the phase-change material, and a paraffin in the phase-change material. The lipophilic monomer above has at least three free isocyanate functional groups.

The waterborne polyurethane is used as a surfactant and a hydrophilic monomer for forming the shells of the microcapsules. The phase-change material is used as an organic solvent to dissolve the lipophilic monomer for forming the shells of the microcapsules. Therefore, a surfactant and an organic solvent can be omitted in this composition.

In another aspect, a method of fabricating microcapsules encapsulating phase-change material is provided. First, a waterborne polyurethane is dispersed in water to form an aqueous solution, and a lipophilic monomer and a paraffin are dissolved in a polar phase-change material to form an organic solution. The lipophilic monomer above has at least three free isocyanate functional groups.

Next, the aqueous solution and the organic solution are mixed in a reactor to form an emulsion. The emulsion is heated to form hydrophilic shells of microcapsules by interfacial condensation polymerization of the waterborne polyurethane and the lipophilic monomer.

It is to be understood that both the foregoing general description and the following detailed description are by examples, and are intended to provide further explanation of the invention as claimed.

DETAILED DESCRIPTION

A composition for fabricating microcapsules encapsulating phase-change material and a method for fabricating the microcapsules of the present invention can be more fully understood by reading the following detailed description.

A composition used for fabricating microcapsules encapsulating phase-change material by interfacial condensation polymerization without using organic solvent and surfactant is provided. This composition has two phases, a water phase and an oil phase. The water phase comprises a waterborne polyurethane dispersed in water, wherein the waterborne polyurethane is used as a hydrophilic monomer and a surfactant. The oil phase comprises a phase-change material, a lipophilic monomer, and a paraffin, wherein the phase-change material is used as an organic solvent to dissolve the lipophilic monomer and the paraffin. Since the phase-change material can be used as an organic solvent of the oil phase, an additional organic solvent is not needed here. Similarly, since the waterborne polyurethane can be used as a surfactant, surfactant is not needed here, either.

The weight percentages of the waterborne polyurethane, the phase-change material, the lipophilic monomer, and the paraffin in the composition described above are about 3-9.5%, about 26-37%, about 1-4%, and about 1-2%, respectively. The remainder of the composition is water.

In the reference, "waterborne polyurethanes—polyurethane research" (by Bayer Polymers and which is entirely incorporated herein by reference), many kinds of waterborne polyurethanes are introduced. The typical waterborne polyurethane is actually a polyurethane-polyurea, i.e. a polymer is characterized by the occurrence of both urethane (—NH—COO—) and urea (—NH—CO—NH—) groups in the polymer chain. The waterborne polyurethane is usually obtained by polymerization of monomers includes polyisocyanates, polyols and polyamines in water phase. In one embodiment of this invention, the waterborne polyurethane is synthesized by polymerization of a polyurethane prepolymer, 2,2-bis(hydroxymethyl)propionic acid (or its triethyl amine salt), and a diamine containing a sulfonate functional group. The diamine containing a sulfonate functional group can be $H_2N—(CH_2)_2—NH—(CH_2)_3—SO_3Na$, for example.

Optionally, an organic silicone compound having the formula of $Si(OR)_nR'_{4-n}$, wherein the n is 1, 2 or 3, can be further added into the starting materials of the waterborne polyurethane. The R in the above chemical formula is an alkyl group having 1-3 carbons, and at least one R' is an alkyl group having at least one primary amino group. Hence, the waterborne polyurethane can also be synthesized by polymerization of the polyurethane prepolymer, 2,2-bis(hydroxymethyl)propionic acid (or its triethyl amine salt), the diamine containing a sulfonate functional group, and the organic silicone compound. The examples of the organic silicone compound are listed in Table 1.

TABLE 1

| Code name | Chemical Formula |
|---|---|
| CB-640 | $H_2N—(CH_2)_3—Si(OCH_3)_3$ |
| CB-641 | $H_2N—(CH_2)_2—NH—(CH_2)_3—Si(OCH_3)_2(CH_3)$ |
| CB-645 | $H_2N—(CH_2)_2—NH—(CH_2)_3—Si(OCH_3)(CH_3)_2$ |
| CB-650 | $H_2N—(CH_2)_3—Si(OC_2H_5)_3$ |

In one embodiment, the phase-change material is a polar organic compound, such as a carboxylic ester. The polar carboxylic ester, instead of conventionally used hydrocarbon compound, is used as an organic solvent of the oil phase to dissolve the lipophilic monomer. A carboxylate of the carboxylic ester can be formate, acetate or propionate. For the carboxylic ester has a phase-change temperature of about −20° C. to about 40° C., the alkoxyl group of the carboxylic ester has a carbon number of 10 to 18. For the carboxylic ester has a phase-change temperature of about 45° C. to about 80° C., the alkoxyl group of the carboxylic ester has a carbon number of 20 to 28.

According to an embodiment of this invention, the lipophilic monomer can be a polyisocyanate having at least three free isocyanate functional groups, such as an isocyanurate having three free isocyanate functional groups. The isocyanurate having three isocyanate functional groups can be isocyanurate of 1,6-hexamethylene diisocyanate, for example.

In one embodiment of this invention, the paraffin $C_nH_{2n+2}$ can have 8-40 carbons, for example. Since the paraffin is used as a seed when the phase of the phase-change material changes from liquid to solid, the melting point of the paraffin is better to be higher than the melting point of the phase-change material by at least 10° C.

According to one embodiment, the microcapsules encapsulating phase-change material are synthesized as follow. The water phase and the oil phase, as described above, are added in a reactor and then emulsified by a homogenizer, such as a mechanical stirrer, for 2 minutes to 5 minutes to form an emulsion. A stirring rate of the mechanical stirrer is about 4000 rpm to about 9000 rpm. The obtained emulsion is then heated under a temperature of about 20° C. to about 90° C. by a gradient heating process having plural constant temperatures maintained for 1 hour to 5 hours to perform the interfacial condensation polymerization reaction. For example, a first constant temperature can be 20° C. to 40° C. and maintained for about 2 hour to about 5 hours. A second constant temperature can be 40° C. to 60° C. and maintained for about 1 hour to about 3 hours. A third constant temperature can be 60° C. to 90° C. and maintained for about 30 minutes to about 2 hours. Generally, the microcapsules encapsulating phase-change material can be obtained by heating the emulsion using the heating process above for about 3.5 hours to about 10 hours in total.

In the interfacial condensation polymerization method above, the waterborne polyurethane is used as a surfactant to form micelles surrounding the oil phase described above. Hence, the waterborne polyurethane can react with the lipophilic monomer on the surface of the micelles, i.e. the interface between water and oil, to form hydrophilic shells of the microcapsules, which encapsulate the phase-change material and the paraffin. Therefore, surfactant used in conventional methods is not needed here, and the hydrophilic microcapsules can be dispersed in water.

Although an additional organic solvent is not needed in the method provided above, an additional organic solvent still could be added since the microcapsules encapsulating phase-change material are dispersed in the water phase. Therefore, the residual organic solvent can be separated from the water phase by distilling under a reduced pressure.

Example 1

| Water phase | |
|---|---|
| Water | 300 g |
| Waterborne polyurethane | 69 g |
| Oil phase | |
| hexadecanyl formate | 207 g |
| isocyanurate of 1,6-hexamethylene diisocyanate | 11 g |
| paraffin ($C_{28}H_{58}$) | 11 g |

The composition in the table above was put in a reactor and then stirred at a rate of 7000 rpm for 3 minutes. The waterborne polyurethane was synthesized by polymerization of polyurethane prepolymer, 2,2-bis(hydroxymethyl)propionic acid, and $H_2N—(CH_2)_2—NH—(CH_2)_3—SO_3Na$. The hexadecanyl formate was used as the phase-change material. The isocyanurate of 1,6-hexamethylene diisocyanate was used as the lipophilic monomer.

After the stirring process, the temperature of the composition was elevated to 40° C. and then kept for 1 hour. Thereafter, the temperature of the composition was elevated at a rate of 10° C./hour until the temperature was 90° C. and then kept for 1 hour. An aqueous solution containing 42 wt % solid was obtained, in which the particle size of the microcapsules was about 3-14 μm, and the phase-change temperature was about 28° C.

Example 2

| Water phase | |
| --- | --- |
| Water | 300 g |
| Waterborne polyurethane | 91 g |
| Oil phase | |
| octadecanyl acetate | 195 g |
| isocyanurate of 1,6-hexamethylene diisocyanate | 15 g |
| paraffin ($C_{28}H_{58}$) | 10 g |

The composition in the table above was put in a reactor and then stirred at a rate of 6500 rpm for 3 minutes. The waterborne polyurethane and the lipophilic monomer was the same as those in Example 1. The octadecanyl acetate was used as the phase-change material.

After the stirring process, the temperature of the composition was elevated to 60° C. and then kept for 3 hours. Thereafter, the temperature of the composition was elevated to 80° C. and then kept for 3 hours. An aqueous solution contained 42 wt % solid was obtained, in which the particle size of the microcapsules was about 4-15 μm, and the phase-change temperature was about 30° C.

Example 3

| Water phase | |
| --- | --- |
| Water | 300 g |
| Waterborne polyurethane | 115 g |
| Oil phase | |
| hexadecanyl acetate | 182 g |
| isocyanurate of 1,6-hexamethylene diisocyanate | 18 g |
| paraffin ($C_{28}H_{58}$) | 10 g |

The composition in the table above was put in a reactor and then stirred at a rate of 5000 rpm for 4 minutes. The waterborne polyurethane and the lipophilic monomer was the same as those in Example 1. The hexadecanyl acetate was used as the phase-change material.

After the stirring process, the temperature of the composition was elevated to 40° C. and then kept for 3 hours. Thereafter, the temperature of the composition was elevated to 60° C. and then kept for 2 hours. The temperature was then elevated to 80° C. and then kept for 1 hour. An aqueous solution containing 41 wt % solid was obtained, in which the particle size of the microcapsules was about 7-18 μm, and the phase-change temperature was about at 24° C.

Example 4

| Water phase | |
| --- | --- |
| Water | 300 g |
| Waterborne polyurethane | 83 g |
| Oil phase | |
| hexadecanyl acetate | 100 g |
| octadecanyl acetate | 100 g |
| isocyanurate of 1,6-hexamethylene diisocyanate | 13 g |
| paraffin ($C_{28}H_{58}$) | 10 g |

The composition in the table above was put in a reactor and then stirred at a rate of 6000 rpm for 3 minutes. The waterborne polyurethane and the lipophilic monomer was the same as those in Example 1. The hexadecanyl acetate and octadecanyl acetate were used as the phase-change material.

After the stirring process, the temperature of the composition was elevated to 45° C. and then kept for 3 hours. Thereafter, the temperature of the composition was elevated to 65° C. and then kept for 2 hours. The temperature was then elevated to 85° C. and then kept for 1 hour. An aqueous solution containing 42 wt % solid was obtained, in which the particle size of the microcapsules was about 6-18 μm, and the phase-change temperature was about at 28° C.

Example 5

| Water phase | |
| --- | --- |
| Water | 300 g |
| Waterborne polyurethane | 124 g |
| Oil phase | |
| octadecanyl acetate | 89 g |
| octadecanyl propionate | 89 g |
| isocyanurate of 1,6-hexamethylene diisocyanate | 20 g |
| paraffin ($C_{28}H_{58}$) | 9 g |

The composition in the table above was put in a reactor and then stirred at a rate of 7500 rpm for 2.5 minutes. The waterborne polyurethane and the lipophilic monomer was the same as those in Example 1. The octadecanyl acetate and octadecanyl propionate were used as the phase-change material.

After the stirring process, the temperature of the composition was elevated to 45° C. and then kept for 3 hours. Thereafter, the temperature of the composition was elevated to 60° C. and then kept for 1 hour. Thereafter, the temperature was elevated to 75° C. and then kept for 1 hour. The temperature was then elevated to 90° C. and then kept for 1 hour. An aqueous solution containing 41 wt % solid was obtained, in which the particle size of the microcapsules was about 3-12 μm, and the phase-change temperature was about 29° C.

Example 6

| Water phase | |
| --- | --- |
| Water | 300 g |
| Waterborne polyurethane | 110 g |
| Oil phase | |
| octadecanyl propionate | 185 g |
| isocyanurate of 1,6-hexamethylene diisocyanate | 16 g |
| paraffin ($C_{28}H_{58}$) | 10 g |

The composition in the table above was put in a reactor and then stirred at a rate of 8000 rpm for 2 minutes. The waterborne polyurethane and the lipophilic monomer was the same as those in Example 1. The octadecanyl propionate was used as the phase-change material.

After the stirring process, the temperature of the composition was elevated to 40° C. and then kept for 1 hour. Thereafter, the temperature of the composition was elevated at a rate of 10° C./hour until the temperature was 90° C. The temperature of 90° C. was kept for 1 hour. An aqueous solution containing 41 wt % solid was obtained, in which the particle size of the microcapsules was about 2-11 µm, and the phase-change temperature was about 27° C.

Example 7

| Water phase | |
|---|---|
| Water | 300 g |
| Waterborne polyurethane | 85 g |
| Oil phase | |
| decanyl acetate | 200 g |
| isocyanurate of 1,6-hexamethylene diisocyanate | 13 g |
| paraffin ($C_{20}H_{42}$) | 11 g |

The composition in the table above was put in a reactor and then stirred at a rate of 6000 rpm for 3 minutes. The waterborne polyurethane and the lipophilic monomer was the same as those in Example 1. The decanyl acetate was used as the phase-change material.

After the stirring process, the temperature of the composition was elevated to 45° C. and then kept for 3 hours. Thereafter, the temperature of the composition was elevated to 65° C. and then kept for 2 hours. The temperature was then elevated to 85° C. and then kept for 1 hour. An aqueous solution containing 42 wt % solid was obtained, in which the particle size of the microcapsules was about 6-18 µm, and the phase-change temperature was about −13° C.

From the example disclosed above, hydrophilic microcapsules encapsulating phase-change material and paraffin are synthesized and obtained. Since the waterborne polyurethane can play the role of surfactant, and the phase-change material can play the role of organic solvent, there is no need to add surfactant and organic solvent. Consequently, the obtained hydrophilic microcapsules are directly dispersed in water. Therefore, no additional heating process is needed to remove residual organic solvent.

Two examples of adding additional organic solvent are disclosed below to show that the hydrophilic microcapsules can also be synthesized in the presence of an additional organic solvent, since the waterborne polyurethane can act as a surfactant.

Example 8

| Water phase | |
|---|---|
| Water | 300 g |
| Waterborne polyurethane | 48 g |
| Oil phase | |
| octadecanyl formate | 217 g |
| isocyanurate of 1,6-hexamethylene diisocyanate | 7 g |
| paraffin ($C_{28}H_{58}$) | 17 g |
| ethyl acetate | 120 g |

The composition in the table above was put in a reactor and then stirred at a rate of 7000 rpm for 3 minutes. The waterborne polyurethane and the lipophilic monomer was the same as those in Example 1. The octadecanyl formate was used as the phase-change material. The ethyl acetate was used as the additional organic solvent.

After the stirring process, the temperature of the composition was elevated to 40° C. and then kept for 3 hours. Thereafter, the temperature of the composition was elevated to 60° C. and then kept for 2 hours. The temperature was then elevated to 80° C. and then kept for 1 hour. An aqueous solution containing 44 wt % solid was obtained, in which the particle size of the microcapsules was about 3-14 µm, and the phase-change temperature was about 37° C.

Example 9

| Water phase | |
|---|---|
| Water | 300 g |
| Waterborne polyurethane | 143 g |
| Oil phase | |
| octadecanyl acetate | 169 g |
| isocyanurate of 1,6-hexamethylene diisocyanate | 21 g |
| paraffin($C_{28}H_{58}$) | 13 g |
| ethyl acetate | 120 g |

The composition in the table above was put in a reactor and then stirred at a rate of 6500 rpm for 3 minutes. The waterborne polyurethane and the lipophilic monomer was the same as those in Example 1. The octadecanyl acetate was used as the phase-change material. The ethyl acetate was used as the additional organic solvent.

After the stirring process, the temperature of the composition was elevated to 60° C. and then kept for 3 hours. Thereafter, the temperature of the composition was elevated to 80° C. and then kept for 3 hours. An aqueous solution containing 40 wt % solid contained was obtained, in which the particle size of the microcapsules was about 5-15 µm, and the phase-change temperature was about 30° C.

Example 10

| Water phase | |
|---|---|
| Water | 300 g |
| Waterborne polyurethane | 83 g |
| Oil phase | |
| hexadecanyl acetate | 100 g |
| octadecanyl acetate | 100 g |
| isocyanurate of 1,6-hexamethylene diisocyanate | 13 g |
| paraffin ($C_{28}H_{58}$) | 10 g |

The composition in the table above was put in a reactor and then stirred at a rate of 6000 rpm for 3 minutes. In Example 10, the waterborne polyurethane was synthesized by polymerization of polyurethane prepolymer, 2,2-bis(hydroxymethyl)propionic acid, $H_2N-(CH_2)_2-NH-(CH_2)_3-SO_3Na$, and $H_2N-(CH_2)_2-NH-(CH_2)_3-Si(OCH_3)_2(CH_3)$. The organic silicone compound, $H_2N-(CH_2)_2-NH-(CH_2)_3-Si(OCH_3)_2(CH_3)$, is added here for increasing the adhesion strength of the hydrophilic microcapsules to a fabric.

In the comparative example, the waterborne polyurethane was synthesized by polymerization of polyurethane prepolymer, 2,2-bis(hydroxymethyl)propionic acid, and $H_2N-(CH_2)_2-NH-(CH_2)_3-SO_3Na$.

Both in Example 10 and the comparative example, the hexadecanyl acetate and octadecanyl acetate were used as the phase-change material, and the isocyanurate of 1,6-hexamethylene diisocyanate was used as the lipophilic monomer. The reaction processes are the same for both the Example 10 and the comparative example. The reaction process was performed as follow.

After the stirring process, the temperature of the composition was elevated to 45° C. and then kept for 3 hours. Thereafter, the temperature of the composition was elevated to 65° C. and then kept for 2 hours. Then, the temperature of the composition was elevated to 85° C. and then kept for 1 hours. An aqueous solution containing 42 wt % solid was obtained, in which the particle size of the microcapsules was about 6-18 μm, and the phase-change temperature was about 28° C.

A wash endurance test was performed according to the standard of AATCC 135 (Dimensional Changes in Automatic Home Laundering of Woven and Knit Fabrics) defined by The American Association of Textile Chemists and Colorists. The test results are listed below. From the data of table 2, the waterborne polyurethane modified by organic silicone compound in example 10 can efficiently increase the adhesion strength of the microcapsules to the fabric. Hence, the remained enthalpy percentage is much higher than the comparative example.

TABLE 2

Results of wash endurance test. The temperatures listed in round brackets are the measured phase-change temperatures.

| | Examples | |
|---|---|---|
| | Example 10 | Comparative example |
| Measured Enthalpy before washing (J/g) | 6.453 (28.11° C.) | 5.047 (27.94° C.) |
| Measured Enthalpy after washing for one time (J/g) | 5.949 (28.05° C.) | 3.237 (28.10° C.) |
| Remained Enthalpy percentage | 92.19% | 64.14% |

Although the present invention has been described in considerable detail with reference to certain examples thereof, other variations are possible. For example, persons skilled in the art can choose suitable material to form the hydrophilic microcapsules and suitable phase-change material according their needs. Therefore, the spirit and scope of the appended claims should not be limited to the description of the preferred embodiments contained herein.

It will be apparent to those skilled in the art that various modifications and variations can be made to the structure of the present invention without departing from the scope or spirit of the invention. In view of the foregoing, it was intended that the present invention cover modifications and variations of the invention provided they fall within the scope of the following claims and their equivalents.

What is claimed is:

1. A composition for fabricating microcapsules encapsulating phase-change material, comprising:
   water;
   a waterborne polyurethane dispersed in the water and having a weight percentage of about 3%-9.5% in the composition;
   a polar phase-change material;
   a lipophilic monomer dissolved in the phase-change material, wherein the lipophilic monomer has at least three free isocyanate functional groups and has a weight percentage of about 1%-4% in the composition; and
   a paraffin in the phase-change material.

2. The composition of claim 1, wherein the waterborne polyurethane is polymerized by precursors comprising polyurethane prepolymer, 2,2-bis(hydromethyl)propionic acid, and a diamine containing a sulfonate functional group.

3. The composition of claim 2, wherein the diamine containing a sulfonate functional group comprises $H_2N-(CH_2)_2-NH-(CH_2)_3-SO_3Na$.

4. The composition of claim 2, wherein the precursors further comprises an organic silicon compound of the chemical formula $Si(OR)_nR'_{4-n}$, and
   n is 1, 2 or 3;
   R is an alkyl group having 1-3 carbons; and
   R' is an alkyl group having at least one primary amino group.

5. The composition of claim 4, wherein the organic silicon compound is $H_2N-(CH_2)_3-Si(OCH_3)_3$, $H_2N-(CH_2)_2-NH-(CH_2)_3-Si(OCH_3)_2(CH_3)$, $H_2N-(CH_2)_2-NH-(CH_2)_3-Si(OCH_3)(CH_3)_2$, or $H_2N-(CH_2)_3-Si(OC_2H_5)_3$.

6. The composition of claim 1, wherein the polar phase-change material comprises carboxylic ester.

7. The composition of claim 6, wherein the carboxylic ester has a carboxylate group selected from a group consisting of formate, acetate and propionate.

8. The composition of claim 6, wherein an alkoxyl group of the carboxylic ester has a carbon number of 10-28.

9. The composition of claim 1, wherein the polar phase-change material has a weight percentage of about 26%-37% in the composition.

10. The composition of claim 1, wherein the lipophilic monomer is isocyanurate of 1,6-hexamethylene diisocyanate.

11. The composition of claim 1, wherein the paraffin comprises $C_nH_{2n+2}$ and n is 8-40.

12. The composition of claim 1, wherein a melting point of the paraffin is greater than that of the phase-change material by at least 10° C.

13. The composition of claim 1, wherein the paraffin has a weight percentage of about 1%-2% in the composition.

14. A method of fabricating microcapsules encapsulating phase-change material, comprising:
   dispersing a waterborne polyurethane in water to form an aqueous solution;
   dissolving a lipophilic monomer and a paraffin in a polar phase-change material to form an organic solution, wherein the lipophilic monomer has at least three free isocyanate functional groups;
   mixing the aqueous solution and the organic solution in a reactor to form an emulsion; and
   heating the emulsion to form hydrophilic shells of microcapsules by interfacial condensation polymerization of the waterborne polyurethane and the lipophilic monomer.

15. The method of claim 14, wherein the waterborne polyurethane is polymerized by precursors comprising polyurethane prepolymer, 2,2-bis(hydroxymethyl)propionic acid, and a diamine containing a sulfonate functional group.

16. The method of claim 15, wherein the diamine containing a sulfonate functional group comprises $H_2N$—$(CH_2)_2$—$NH$—$(CH_2)_3$—$SO_3Na$.

17. The method of claim 15, wherein the precursors further comprises an organic silicon compound of the chemical formula $Si(OR)_n R'_{4-n}$, and n is 1, 2 or 3;

R is an alkyl group having 1-3 carbons; and

R' is an alkyl group having at least one primary amino group.

18. The method of claim 17, wherein the organic silicon compound is $H_2N$—$(CH_2)_3$—$Si(OCH_3)_3$, $H_2N$—$(CH_2)_2$—$NH$—$(CH_2)_3$—$Si(OCH_3)_2(CH_3)$, $H_2N$—$(CH_2)_2$—$NH$—$(CH_2)_3$—$Si(OCH_3)(CH_3)_2$, or $H_2N$—$(CH_2)_3$—$Si(OC_2H_5)_3$.

19. The method of claim 14, wherein the polar phase-change material comprises carboxylic ester.

20. The method of claim 19, wherein the carboxylic ester has a carboxylate group selected from a group consisting of formate, acetate and propionate.

21. The method of claim 19, wherein an alkoxyl group of the carboxylic ester has a carbon number of 10-28.

22. The method of claim 14, wherein the lipophilic monomer is isocyanurate of 1,6-hexamethylene diisocyanate.

23. The method of claim 14, wherein the paraffin comprises $C_nH_{2n+2}$ and n is 8-40.

24. The method of claim 14, wherein a melting point of the paraffin is greater than that of the phase-change material by at least 10° C.

25. The method of claim 14, wherein the emulsion is heated by a gradient heating process having plural constant temperatures maintained for 1 hour to 5 hours.

26. The method of claim 25, wherein the plural constant temperatures are about 20-90° C.

* * * * *